(12) United States Patent
Park

(10) Patent No.: US 6,995,805 B1
(45) Date of Patent: Feb. 7, 2006

(54) METHOD AND SYSTEM FOR SCENE CHANGE DETECTION

(75) Inventor: Geoffrey Park, Toronto (CA)

(73) Assignee: Sonic Solutions, Novato, CA (US)

( * ) Notice: Subject to any disclaimer, the term of this patent is extended or adjusted under 35 U.S.C. 154(b) by 569 days.

(21) Appl. No.: 09/675,358

(22) Filed: Sep. 29, 2000

(51) Int. Cl.
*H04N 5/14* (2006.01)

(52) U.S. Cl. .................................................. 348/700

(58) Field of Classification Search ................ 348/700, 348/701, 571
See application file for complete search history.

(56) References Cited

U.S. PATENT DOCUMENTS

| 5,459,517 A | 10/1995 | Kunitake et al. |
| 5,917,990 A | 6/1999 | Zamara et al. |
| 6,014,183 A | 1/2000 | Hoang |

OTHER PUBLICATIONS

Ullas Gargi, et al., "Performance Characterization of Video-Shot-Change Detection Methods", IEEE Transactions on Circuits and Systems for Video Technology, vol. 10, No. 1, Feb. 2000, pp. 1-13.

*Primary Examiner*—Young Lee
(74) *Attorney, Agent, or Firm*—Martine Penilla & Gencarella, LLP

(57) ABSTRACT

A method, in one exemplary embodiment, for automatically detecting scene changes within a digital video sequence including a succession of frames, including computing metrics, for each of a plurality of frames from a digital video sequence, the metric of a frame being a measure of distance between the frame and a given frame, identifying a candidate frame for which the metric of the candidate frame differs from the metric of the predecessor frame to the candidate frame, by at least a first threshold, determining whether the metrics of successive ones of each of a first plurality of frames, successively following the candidate frame, differ from one another by less than a second threshold, and further determining whether the metrics of each frame of a second plurality of frames, successively preceding the candidate frame, are larger than a third threshold. A system, of one exemplary embodiment, is also described and claimed.

10 Claims, 10 Drawing Sheets

METHOD AND SYSTEM FOR SCENE CHANGE DETECTION

FIELD OF THE INVENTION

The present invention relates to video processing, and more specifically to automatic scene change detection for digital video sequences of frames.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Scene change detection (also referred to in the literature as "shot change detection") is the process of identifying changes in the scene content of a video sequence. Scene change detection is primarily used to segment video into scenes, and facilitate browsing of video sequences and retrieval of desired video content.

Scene changes can occur as abrupt changes when a frame from one shot is followed by a frame from a different shot, and as gradual transitions such as fade-ins and fade-outs.

A survey of scene change algorithms is provided in Gargi, U., Kasturi, R. and Strayer, Susan, "Performance Characterization of Video-Shot-Change Detection Methods," IEEE Transactions on Circuits and Systems for Video Technology, Vol. 10, No. 1, February 2000, pages 1–13. One class of algorithms used to perform automatic scene detection is color histogram methods. The difference between color histograms of consecutive frames is determined, and large frame differences are flagged as possible scene changes. Another class of algorithms performs scene detection directly on MPEG compressed video, using discrete cosine transform (DCT) and motion prediction information.

A reference for various metrics used for scene change detection, is Ford, R. M., Robson, C., Temple, D. and Gerlach, M., "Metrics for Scene Change Detection in Digital Video Sequences," in Proceedings of IEEE International Conference on Multimedia Computing and Systems, Jul. 3–6, 1997, Ottawa, Ontario, Canada.

U.S. Pat. No. 5,956,026 of Ratakonda describes a scene change detection algorithm of Lagendijk that selects scene change locations based on minimization of an action integral.

U.S. Pat. No. 6,014,183 of Hoang describes a method and system for retrieving frames of video data from a display control device and automatically detecting scene changes. Hoang detects scene changes by comparing pixel color values in successive frames.

Microsoft MovieMaker™ and Pinnacle Studio DV™ include scene change detection features.

Prior art scene change detection algorithms suffer from a shortcoming in that intermittent effects within a video shot, such as lighting changes, camera flashes, or a bird flying in and out of a scene, can produce significant changes in color histograms and be interpreted falsely as scene changes. Hoang (col. (col. 8, lines 1–16, and FIG. 8) describes examining a predetermined number of frames in order to determine whether a potential scene change should be considered a bona fide scene change. This serves to filter out isolated events such as flashbulbs going off. Hoang compares frames following a potential scene change with an initial frame, immediately prior to the scene change.

Hoang's method works well to filter out abrupt scene changes, such as the change indicated in FIG. 8 of Hoang. However, Hoang's method can fail to detect bona fide scene changes that are gradual. For gradual scene changes, the differences between frames may not be large enough to exceed Hoang's threshold, and, as a result, Hoang may overlook the gradual scene changes.

SUMMARY OF THE INVENTION

The present invention provides a method and system for automatically detecting scene changes in a digital video sequence. The present invention can be used to reduce false detections due to intermittent effects within the video sequence, by considering successive frame differences within a window of frames. In a preferred embodiment of the present invention, a frame history of a number, n, of frames is analyzed for existence of scene changes. In a preferred embodiment of the present invention, starting from the last frame in the frame history, denoted as the given frame, a search is made running backwards in time from the given frame for the presence of a candidate scene change, indicated by a difference between two successive frames. When such a candidate scene change is encountered, a determination is made as to whether (i) successive frames following the scene change are similar to one another, and (ii) successive frames preceding the scene change are significantly different from the given frame.

This filters out brief intermittent effects. For example, if a camera flashes at frame j and the flash effect lasts briefly for x frames, then the present invention does not flag frame j nor frame j+x as a scene change. Frame j is not flagged, since frame j+x is not similar to frame j+x+1, and thus condition (i) fails. Frame j+x is not flagged, since frame j−1 and the given frame are not significantly different, and thus condition (ii) fails.

There is thus provided in accordance with a preferred embodiment of the present invention a method for automatically detecting scene changes within a digital video sequence including a succession of frames, including computing metrics for each of a plurality of frames from a digital video sequence, the metric of a frame being a measure of distance between the frame and a given frame, identifying a candidate frame for which the metric of the candidate frame differs from the metric of the predecessor frame to the candidate frame, by at least a first threshold, determining whether the metrics of successive ones of each of a first plurality of frames, successively following the candidate frame, differ from one another by less than a second threshold, and further determining whether the metrics of each frame of a second plurality of frames, successively preceding the candidate frame, are larger than a third threshold.

There is further provided in accordance with a preferred embodiment of the present invention a system for automatically detecting scene changes within a digital video sequence including a succession of frames, including a processor computing metrics for each of a plurality of frames from a digital video sequence, the metric of a frame being a measure of distance between the frame and a given frame (which also may be referred to as a current frame), a frame identifier identifying a candidate frame for which the metric of the candidate frame differs from the metric of the predecessor frame to the candidate frame, by at least a first threshold, and a comparator determining whether the metrics of successive ones of each of a first plurality of frames, successively following the candidate frame, differ from one another by less than a second threshold, and determining whether the metrics of each frame of a second plurality of frames, successively preceding the candidate frame, are larger than a third threshold.

There is yet further provided in accordance with a preferred embodiment of the present invention a method for automatically detecting scene changes within a digital video sequence including a succession of frames, including computing metrics for each of a plurality of frames from a digital video sequence, the metric of a frame being a measure of distance between the frame and an initial frame, identifying a candidate frame for which the metric of the candidate frame differs from the metric of the predecessor frame to the candidate frame, by at least a first threshold, determining whether the metrics of successive ones of each of a first plurality of frames, successively preceding the candidate frame, differ from one another by less than a second threshold, further determining whether the metrics of each frame of a second plurality of frames, successively following the candidate frame, are larger than a third threshold.

There is additionally provided in accordance with a preferred embodiment of the present invention a system for automatically detecting scene changes within a digital video sequence including a succession of frames, including a processor computing metrics for each of a plurality of frames from a digital video sequence, the metric of a frame being a measure of distance between the frame and an initial frame, a frame identifier identifying a candidate frame for which the metric of the candidate frame differs from the metric of the predecessor frame to the candidate frame, by at least a first threshold, and a comparator determining whether the metrics of successive ones of each of a first plurality of frames, successively preceding the candidate frame, differ from one another by less than a second threshold, and determining whether the metrics of each frame of a second plurality of frames, successively following the candidate frame, are larger than a third threshold.

There is moreover provided in accordance with a preferred embodiment of the present invention a method for automatically detecting scene changes within a digital video sequence including a succession of frames, including identifying a candidate frame that differs substantially from the predecessor frame to the candidate frame, determining whether a first plurality of frames, successively following the candidate frame, are substantially similar to one another, and further determining whether each of a second plurality of frames, successively preceding the candidate frame, differ substantially from a current frame, wherein the current frame follows the first plurality of frames.

There is further provided in accordance with a preferred embodiment of the present invention a system for automatically detecting scene changes within a digital video sequence including a succession of frames, including a frame identifier identifying a candidate frame that differs substantially from the predecessor frame to the candidate frame, and a comparator determining whether a first plurality of frames, successively following the candidate frame, are substantially similar to one another, and determining whether each of a second plurality of frames, successively preceding the candidate frame, differs substantially from a current frame, wherein the current frame follows the first plurality of frames.

There is yet further provided in accordance with a preferred embodiment of the present invention a method for automatically detecting scene changes within a digital video sequence including a succession of frames, including identifying a candidate frame that differs substantially from the predecessor frame to the candidate frame, determining whether a first plurality of frames, successively preceding the candidate frame, are substantially similar to one another, and further determining whether each of a second plurality of frames, successively following the candidate frame, differs substantially from an initial frame, wherein the initial frame precedes the first plurality of frames.

There is additionally provided in accordance with a preferred embodiment of the present invention a system for automatically detecting scene changes within a digital video sequence including a succession of frames, including a frame identifier identifying a candidate frame that differs substantially from the predecessor frame to the candidate frame, and a comparator determining whether a first plurality of frames, successively preceding the candidate frame, are substantially similar to one another, and determining whether each of a second plurality of frames, successively following the candidate frame, differs substantially from an initial frame, wherein the initial frame precedes the first plurality of frames.

BRIEF DESCRIPTION OF THE DRAWINGS

The present invention will be more fully understood and appreciated from the following detailed description, taken in conjunction with the drawings in which.

LIST OF APPENDICES

Appendix A is a software listing of an algorithm that automatically derives scene changes from within a digital video sequence.

DETAILED DESCRIPTION OF A PREFERRED EMBODIMENT

The present invention provides a method and system for automatic scene change detection for a digital video sequence.

Figure 1:
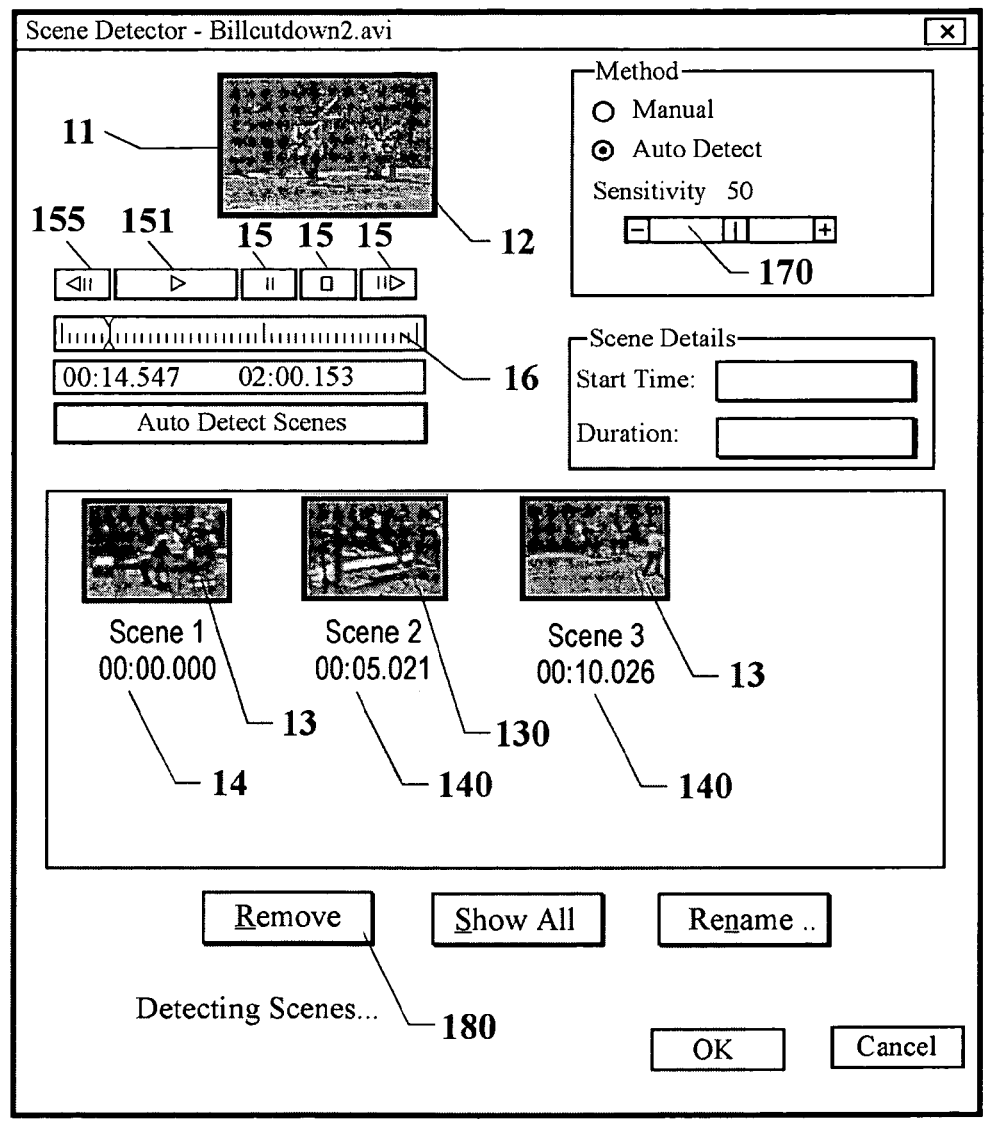
FIG. 1 is a simplified illustration of a scene detector segmenting a video sequence into scenes and displaying representative frames for scenes.

Reference is now made to FIG. 1, which is a simplified illustration of a scene detector segmenting a video sequence into scenes and displaying representative frames for scenes. Shown in FIG. 1 is a digital video clip 110 being played within window 120 and automatically being segmented into scenes. Digital video clip 110 includes a plurality of frames that naturally group together into scenes. Automatic scene change detection software processes the frames of video clip 110 and determines the frames that are located at the beginnings and the ends of scenes. Frames 130 are representative frames for each scene, and are displayed to enable a user to readily identify the scenes of video clip 110. Preferably, the first frame of each scene is displayed. Also indicated in FIG. 1 are the time codes 140 for each scene, so that a user can advance within video clip 110 to a desired scene.

FIG. 1 also illustrates a user interface for an automatic scene change detection system. Buttons 151, 153, 155, 157 and 159 control the playback of video clip 110. Button 151 is used to play video clip 110 at normal speed. Button 153 is used to pause the play. Button 155 is used to jump to the beginning of video clip 110, and button 157 is used to jump to the end of video clip 110. Button 159 is used to stop the play. Progress bar 160 indicates the position of the frames being displayed in window 120 relative to the entire digital video clip 110. Sensitivity slider 170 is used to adjust the thresholds for scene detection. As the values of the threshold parameters are increased, the number of distinct scenes into which video clip 110 is segmented decreases.

Button 180 is used by a user to remove scenes that have been detected. This serves to manually refine the automatic scene detection results by pruning out spurious or unwanted scene segmentations.

Figure 2:
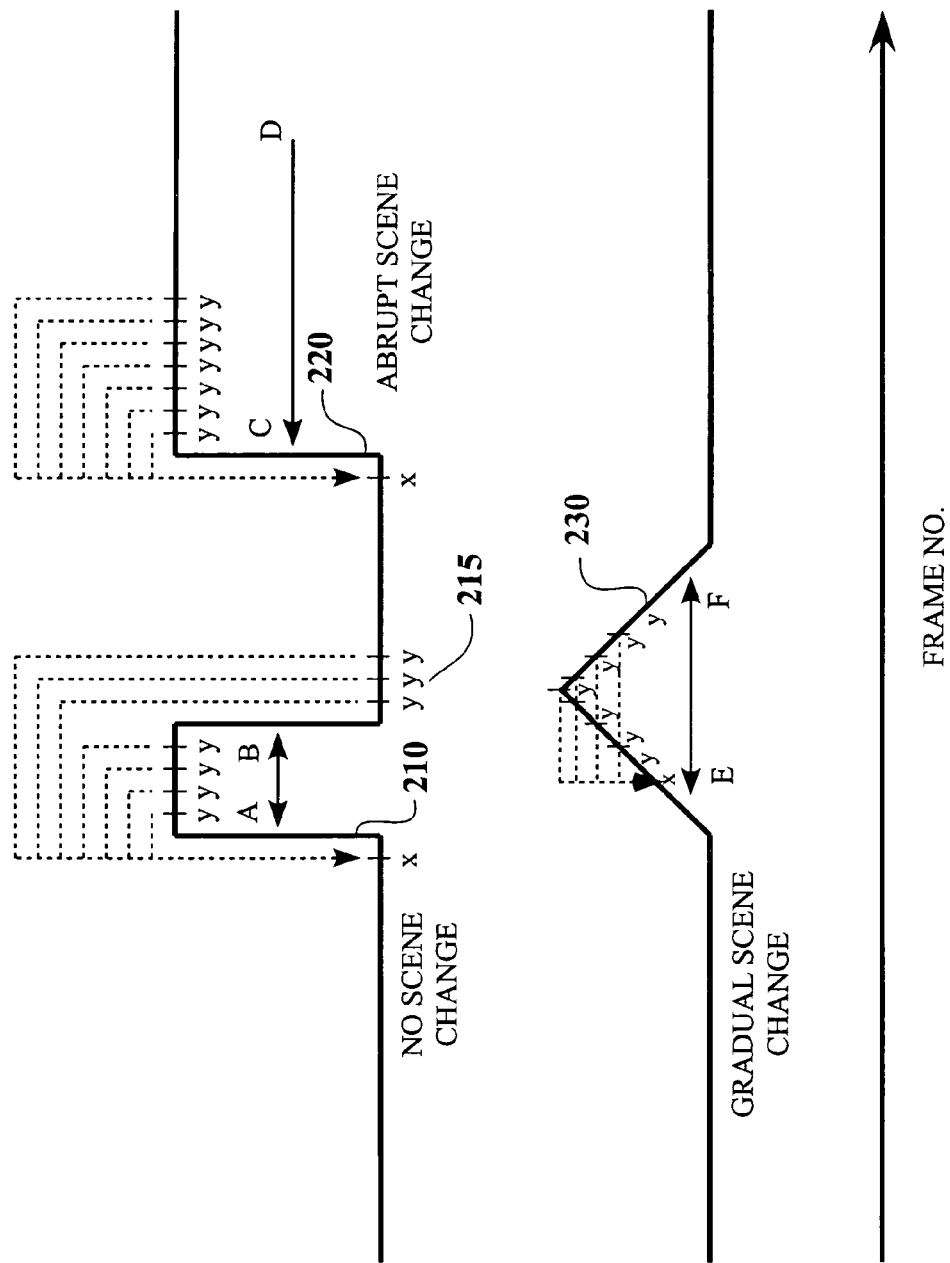
FIG. 2 is a prior art illustration of a method for filtering out candidates for scene changes when the duration of a change is shorter than a predetermined number of frames.
Figure 8:
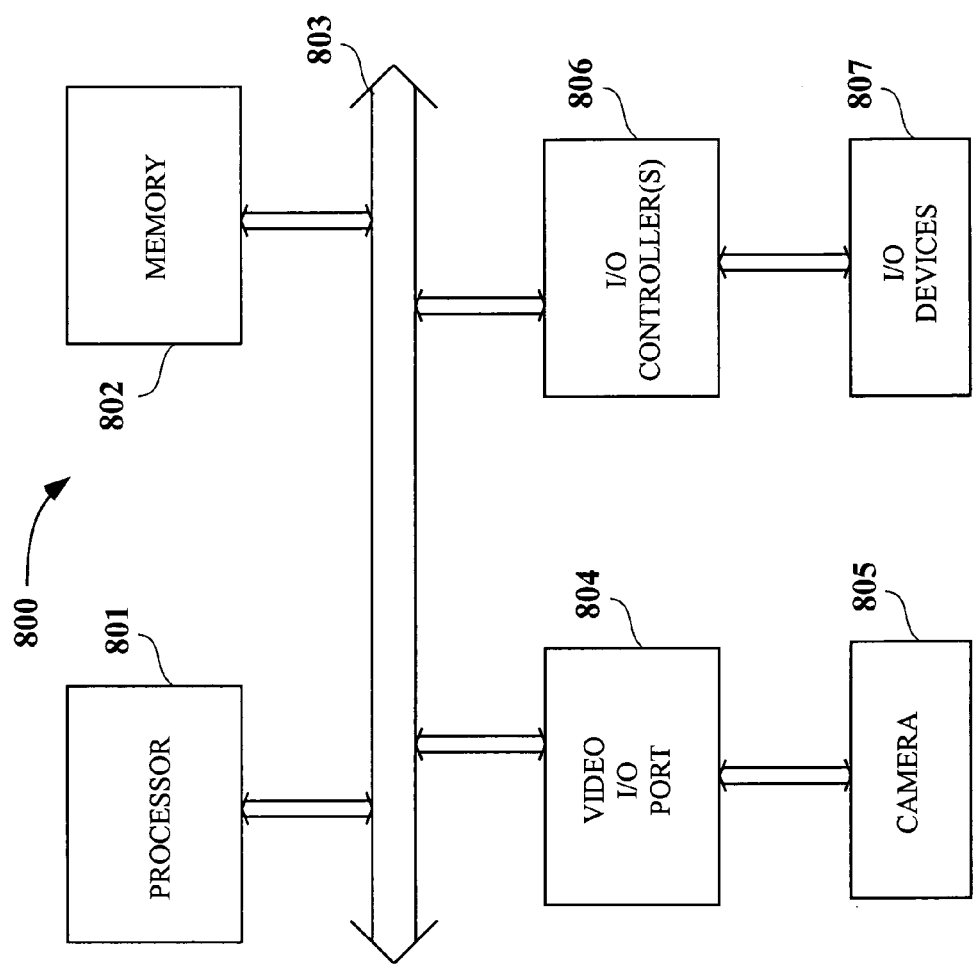
FIG. 8 shows an example of a data processing system according to one exemplary embodiment of the invention.

Reference is now made to FIG. 2, which is a prior art illustration similar to FIG. 8 of Hoang, of a method for filtering out candidates for scene changes when the duration of a change is shorter than a predetermined number of frames. Shown in FIG. 2 is a short segment 210, which is a candidate for a scene change. In order to determine whether segment 210 is a bona fide scene change, Hoang compares each of a predetermined number of frames y with initial frame x, that is situated immediately before the scene change. If some of frames y are similar to frame x, such as frames 215, this indicates that the width AB of the change is too small, and it is not marked as a scene change.

For scene change 220, however, the duration of the change is long, as evidenced by the width CD of the change, and each of frames y is determined to be different from frame x. As such, candidate scene change 220 is flagged as a bona fide scene change.

The scene changes indicated by AB and CD are abrupt changes. Other types of scene changes, such as the change indicated by segment EF, may be more gradual. Typical types of gradual scene changes are video fade-ins and fade-outs, where the end of a first scene gradually fades into the beginning of a second scene. For such scene changes, the method of Hoang may fail to detect a bona fide change. As illustrated in FIG. 2, the segment EF may in fact be long enough to include the predetermined number of frames, but some of frames y may compare favorably with frame x, indicating that the scene change is not an actual change—when in fact it is.

Figure 3:
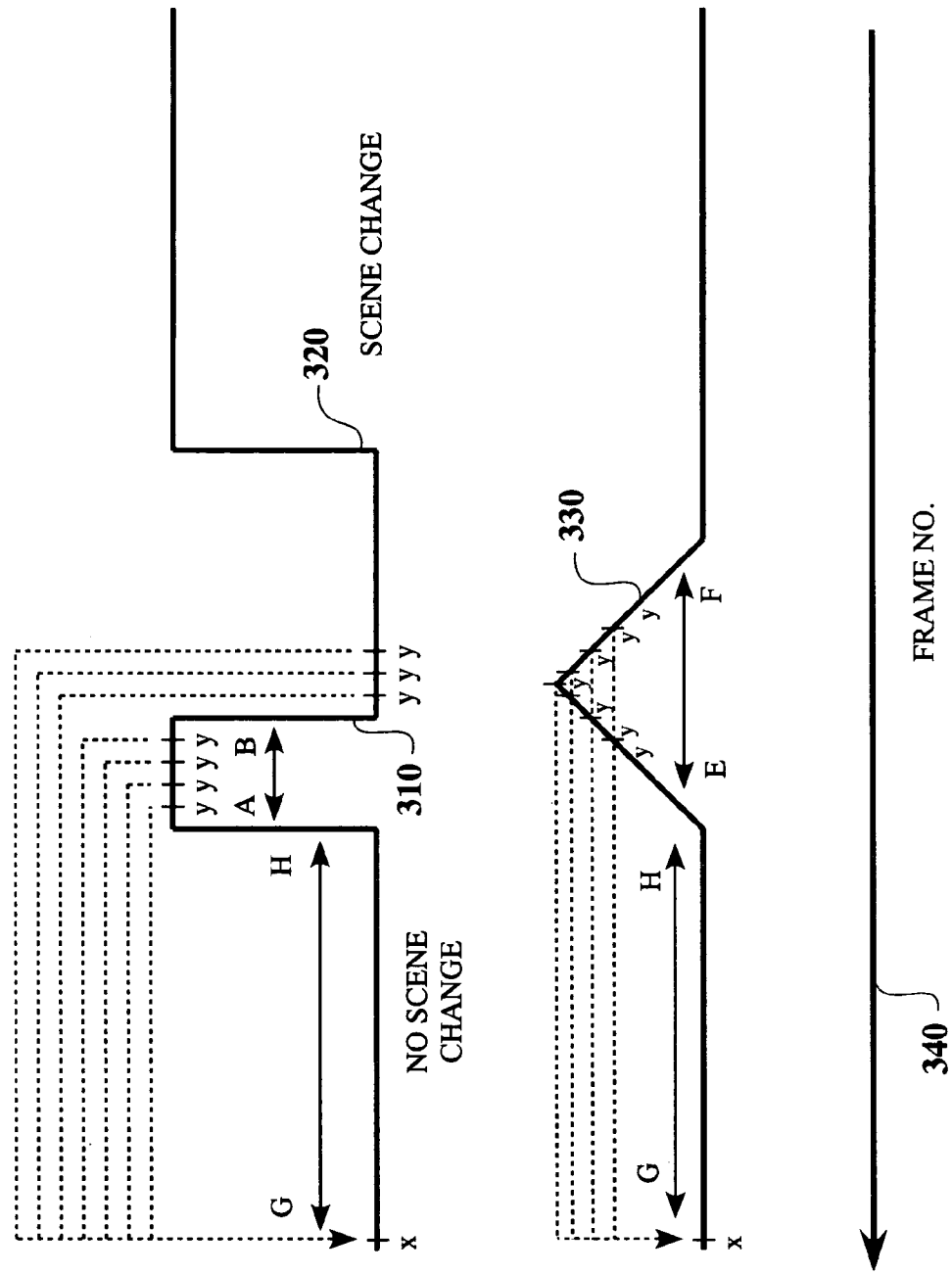
FIG. 3 is an illustration of a scene change detector in accordance with a preferred embodiment of the present invention.

Reference is now made to FIG. 3, which an illustration of a scene change detector in accordance with a preferred embodiment of the present invention. When the present invention encounters a candidate 310 for a scene change, it compares frames y following the scene change with an initial frame x that is a distance GH behind the scene change. As in FIG. 2, this serves to filter out candidate 310 as not being a bona fide scene change, and successfully identifies scene change 320 as being a real scene change. In addition, the method of the present invention overcomes prior art limitations and successfully identifies gradual scene change 330 as a bona fide scene change, since it compares frames y with an initial frame x that is well behind the start of the scene change.

As will be seen in the ensuing discussion, the present invention processes frames in reverse order, beginning with a current frame and proceeding backwards in time. Thus, with reference to FIG. 3, the leftmost frame is a latest frame—a current frame, and the frames to its right are previous frames. This is indicated in the right-to-left direction of axis 340. FIG. 3 was drawn this way in order to compare it directly with prior art FIG. 2. However, in subsequent figures, the time order runs in the conventional left-to-right direction.

Figure 4:
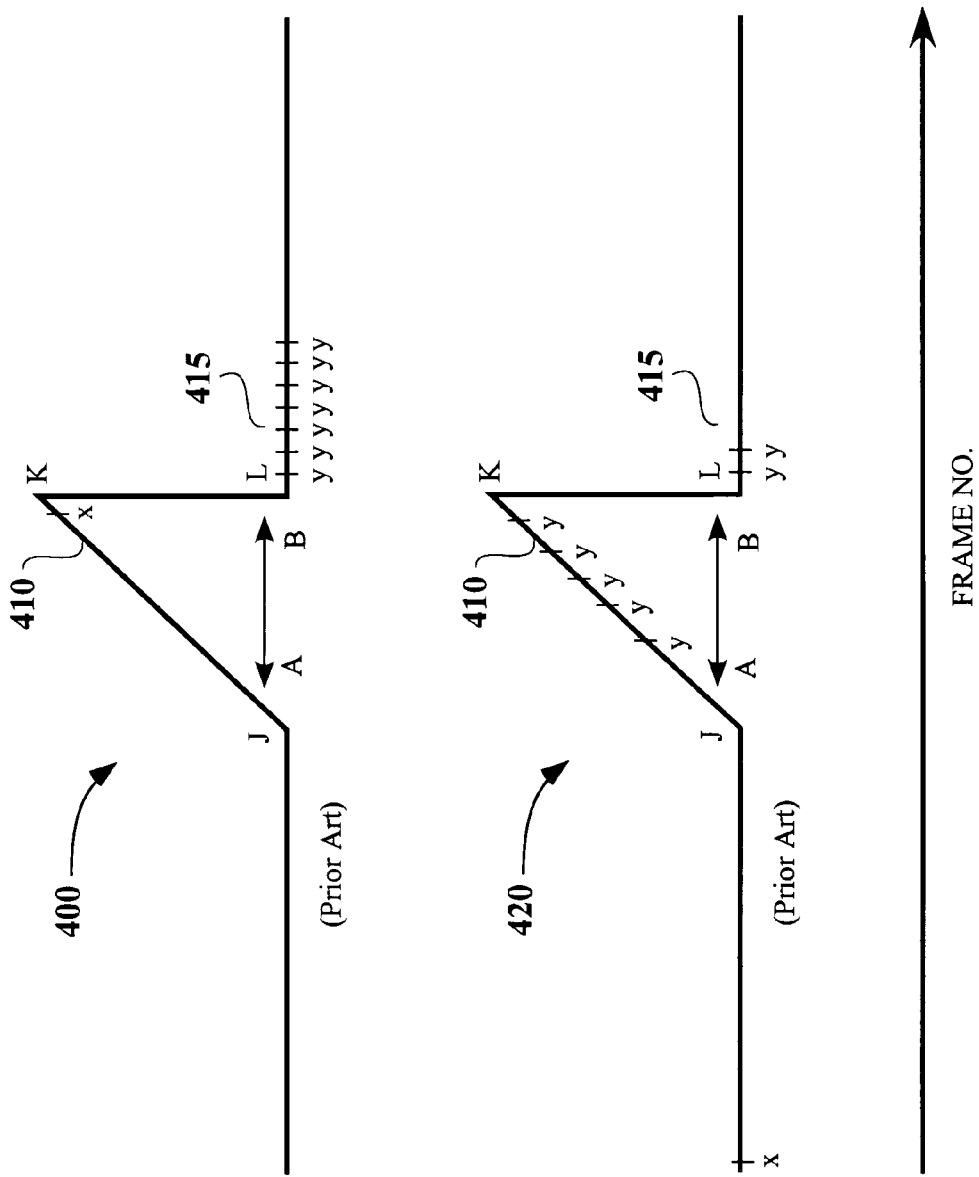
FIG. 4 is an illustration of a false scene detection that is overcome by the present invention.

Reference is now made to FIG. 4, which is an illustration of a false scene detection that is overcome by the present invention. Shown in FIG. 4 is a slowly changing effect 400 from J to K, followed by a rapid change from K to L. For example, a baseball could be gradually approaching a camera in a succession of frames from J to K, and then suddenly disappear from the scene at frame L. The prior art approach of Hoang detects potential scene changes by comparing successive frames. If the frame changes from J to K are sufficiently small, then Hoang will not detect a scene change until the rapid change from K to L occurs. Hoang will then compare the frame at K (marked x) with the frames following it (marked y), and since none of the y frames are similar to the x frame, Hoang will mistakenly identify a scene change between frames K and L.

In distinction, the present invention detects potential scene changes by comparing frames with an initial frame (marked x). Thus, with respect to the effect 420, at some point along the grade from J to K, a frame will differ significantly from frame x, and the present invention will flag it as a candidate scene change. The present invention will then compare several frames following the candidate scene change (marked y) with initial frame x, and conclude that there are frames following the candidate scene change that are similar to frame x. As a result, using the present invention the candidate scene change will be rejected, and no false scene change will be marked.

Figure 5:
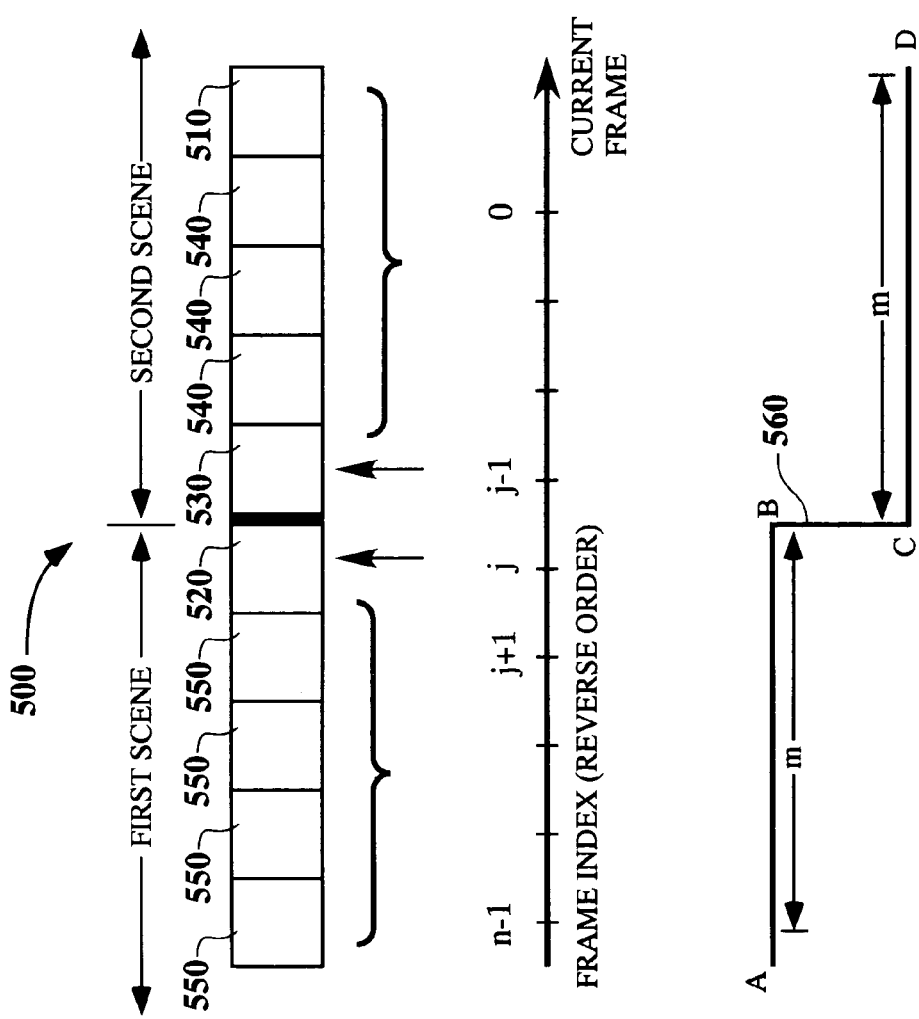
FIG. 5 is a simplified illustration of an arrangement of frames used in a preferred embodiment of the present invention.

Reference is now made to FIG. 5, which is a simplified illustration of a preferred embodiment of the present invention. Shown in FIG. 5 are frames from a video clip 500. Included are a current frame 510, frames 520 and 530 that border a scene change between a first scene and a second scene of video clip 500, frames 540 from the second scene of video clip 500, and frames 550 from the first scene of video clip 500. Frame 520 marks the end of the first scene and frame 530 marks the beginning of the second scene.

In a preferred embodiment, the present invention operates by determining that frames 520 and 530 are substantially different, thereby indicating that these frames are candidate frames for a scene change. Frames can be compared with one another by various metrics, as described hereinabove. In a preferred embodiment of the present invention, histograms are used. The individual color channels of each frame are binned into histogram bins, and the frequencies of color data in each bin are tallied. For example, with respect to an RGB color system, the red, green and blue values of each pixel typically range from 0 to 255 (8 bits). If 16 uniform bins are used for each color channel, then each red value, r, 0<=r<=255, belongs to bin number r>>4, and similarly for each blue and green value. The frequencies of red values in the 16 bins are tabulated and summarized in a histogram hr[i], 0<=i<=15, and similarly for the green and blue values.

In a preferred embodiment of the present invention, pixel color values of a frame are sub-sampled on a sample grid, rather than sampled at every pixel, in order to speed up the processing.

Histograms for two frames are preferably compared by summing absolute values of the differences in their frequencies, for each bin and for each color channel. Specifically, for the above case of 16 bins, what is summed is:

$$\sum_{i=0}^{15}(|hr1[i]-hr2[i]|+|hg1[i]-hg2[i]|+|hb1[i]-hb2[i]|) \quad (1)$$

where hr1, hg1, hb1 are red, green and blue histograms for a first frame, and hr2, hg2 and hb2 are red, green and blue histograms for a second frame. If the sum in Equation (1) exceeds a prescribed upper threshold, then the frames are deemed substantially different. Similarly, if one were interested in determining if two frames are substantially similar, then this can be based on whether the sum in Equation (1) is less than a prescribed lower threshold.

It is apparent to those skilled in the art that other functions can be used for histogram comparison, besides the absolute value function. For example, Equation (1) could be replaced by a sum of squares of histogram differences, instead of a sum of absolute values.

In a preferred embodiment, the present invention determines if at least m frames 540 following frame 530 are substantially similar to one another, and determines if at least m frames 550 preceding frame 520 differ substantially from current frame 510, where m is a predetermined length of frames. It is apparent to those skilled in the art that different values of m may be used for the required numbers of frames 540 and 550.

If it is determined that at least m frames 540 are substantially similar to one another and that at least m frames 550 differ substantially from frame 510, then frames 520 and 530 are marked as a scene change. Referring to graph 560, which indicates the general nature of a scene change, candidate frames 520 and 530 are marked as a scene change when the distances AB and CD are each at least m frames.

With respect to U.S. Pat. No. 6,014,183 of Hoang, the method of Hoang compares each of frames 550 to frame 530, as described hereinabove with reference to FIG. 2. In distinction, the present invention compares frames 550 to frame 510, which is at least m frames distant from the scene change.

Figure 6:
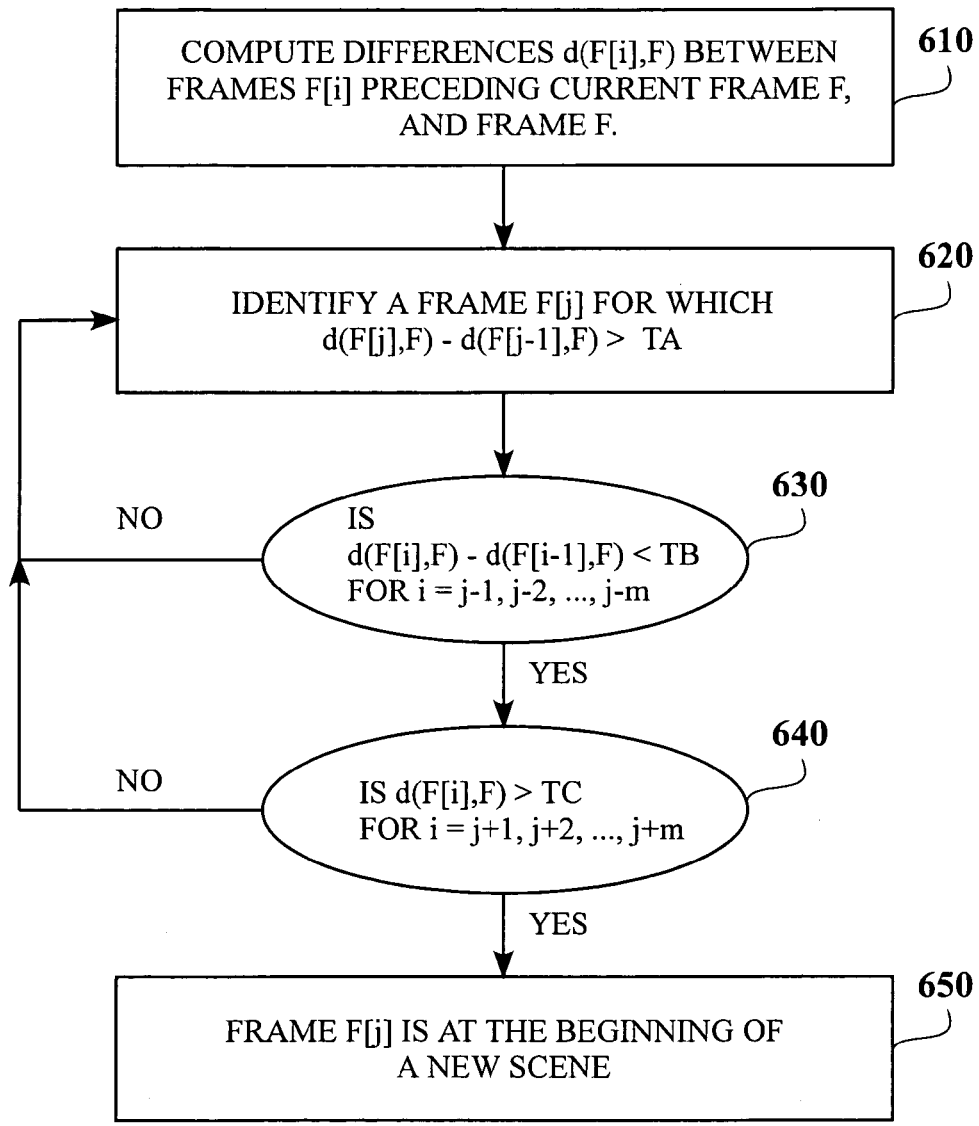
FIG. 6 is a simplified flowchart of a preferred embodiment of the present invention.

Reference is now made to FIG. 6, which is a simplified flowchart of a preferred embodiment of the present invention. At step 610 measures of difference are computed between frames F[i] of a digital video and a current frame, F. The frame index, i, runs backwards in time, with i=0 corresponding to the frame immediately preceding frame F, and with i=1 corresponding to the frame preceding frame F[0]. In a preferred embodiment, the measures of difference are based on histograms.

At step 620 a frame F[j] is identified that differs substantially from frame F[j−1], based on an upper threshold TA. Frames F[j] and F[j−1] become candidates for a scene change, similar to frames 520 and 530 (FIG. 5). The comparison between frames F[j−1] and F[j] is based on the difference d(F[j], F)−d(F[j−1], F). It would be more precise to make this comparison by computing d(F[j], F[j−1]), but this would entail additional processing and slow down the scene detection. By virtue of the mathematical "triangle inequality," an affirmative determination that d(F[j],F)−d(F[j−1],F)>TA implies that in fact d(F[j], F[j−1])>TA. However, the converse is not necessarily true.

At step 630 a determination is made if each of the m consecutive frames F[j−i] and F[j−i−1], 1<=i<=m, are substantially similar, based on a lower threshold TB. If the determination at step 630 is negative, then control returns back to step 620. Otherwise, if the determination at step 630 is positive, then a determination is made at step 640 if the m frames F[j+i], 1<=i<=m, are each substantially different from current frame F, based on an upper threshold TC. If the determination at step 640 is negative, then control returns back to step 620. Otherwise, if the determination at step 640 is positive, then frame F[j] is marked as being at the beginning of a scene.

In a preferred embodiment of the present invention, if a frame preceding frame F[j] is found to be substantially similar to frame F, then frame F[j] is not marked as being at the beginning of a scene.

Figure 7A:
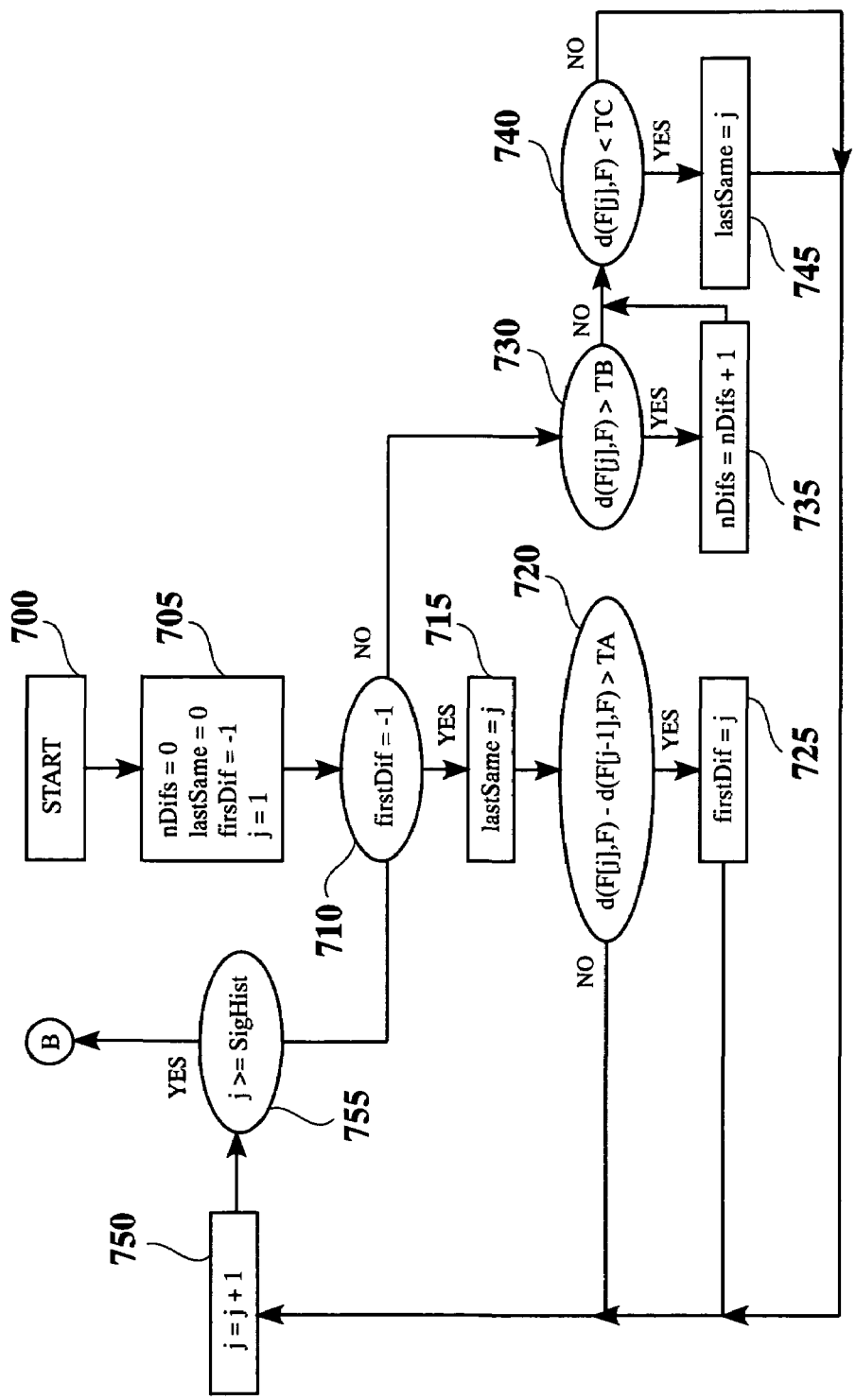
FIGS. 7A and 7B are flowcharts for the algorithm included in the software listing of Appendix A.
Figure 7B:
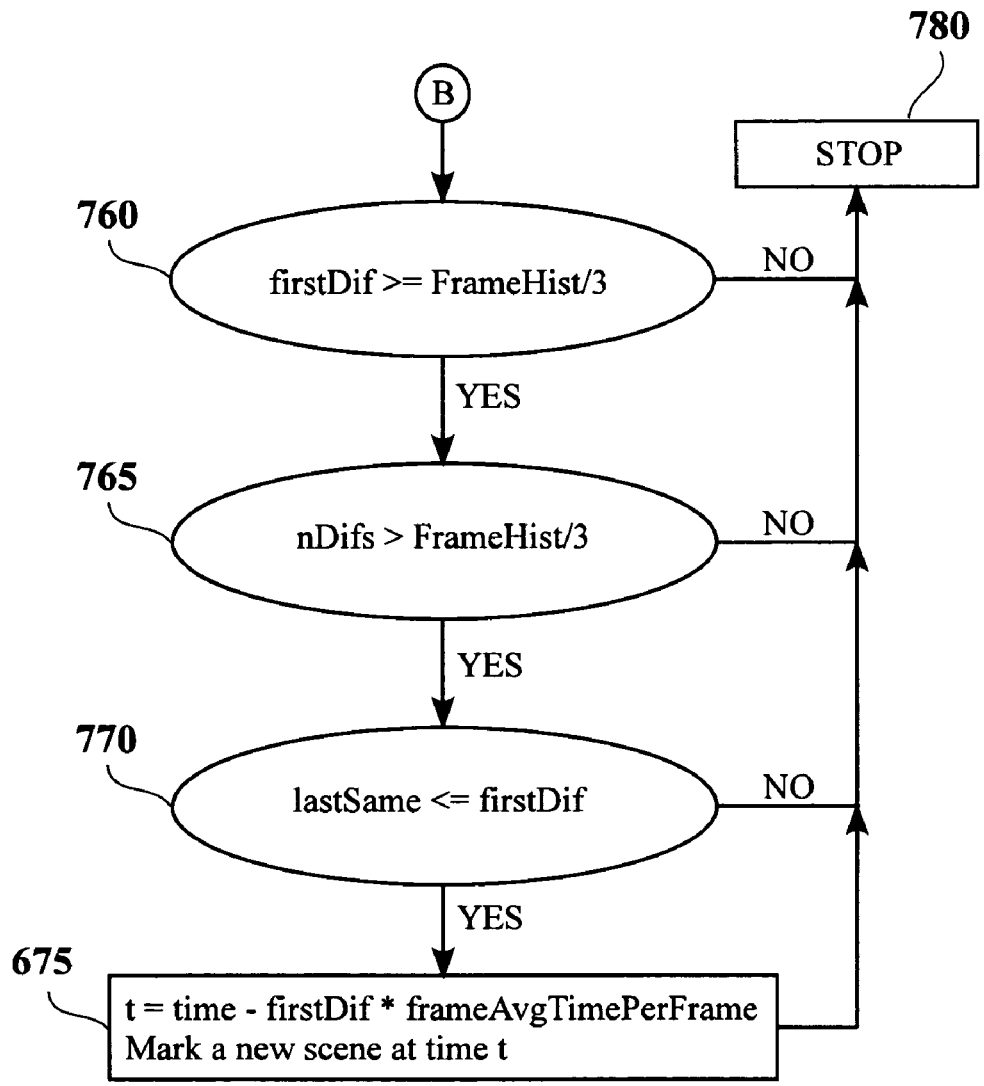

Reference is now made to FIGS. 7A and 7B, in conjunction with the method AnalyseFrame( ) in Appendix A. Appendix A is a software listing for an algorithm that derives scene changes from within a digital video sequence, and FIGS. 7A and 7B are simplified flowcharts of the algorithm of Appendix A. In a preferred embodiment, the present invention operates relative to a current frame, F, corresponding to a time t, and processes a number, SigHist, of frames prior to the current frame. The number SigHist is a parameter for the number of frames in a frame history considered to be significant for analysis of scene change. As mentioned hereinabove with reference to FIG. 6, preferably, the present invention computes distances d(F[j], F) between frames F[j] and current frame F, where frames F[j] are frames prior to frame F. As with FIG. 6, in the discussion of FIGS. 7A and 7B the notation F[j] refers to the frame that is j frames prior to (i.e., to the left of) frame F. I.e., the sequential index j runs backwards from current frame F.

Processing begins at step 700. At step 705, key variables are initialized. At step 710 a loop indexed on a counter j begins, with j initialized to j=1. The counter j counts backwards from current frame F. Thus j=0 refers to the frame prior to frame F, j=1 refers to the frame that is two frames prior to frame F, etc. A determination is made whether firstDif equals −1. If step 710 determines that firstDif equals −1, then lastSame is set to j at step 715 and a determination is made at step 720 whether d(F[j], F) and d(F[j−1], F) differ by an upper threshold TA. The purpose of this test is to determine whether F[j−1] and F[j] are significantly different, and, as mentioned hereinabove, is based on d(F[j], F)−d(F[j−1], F) instead of on d(F[j−1], F[j]), since the latter distance is not one of the precomputed distances. Avoiding direct computation of the distances d(F[j−1], F[j]) serves to speed up the frame processing.

If step 720 determines that the relevant difference exceeds threshold TA, then at step 725 firstDif is set to j. This signifies that the first place prior to frame F where a significant change occurs is between frames F[j] and F[j−1], similar to frames 520 and 530 (FIG. 5). Frames F[j] becomes a candidate frame, F*, for a scene change. Control then passes to step 750, where the counter j is incremented. If step 720 determines that the relevant difference is not less than TA, then control passes directly to step 750.

If step 710 determines that firstDif does not equal −1, then control passes to step 730 where a test is made as to whether F[j] and F differ by more than an upper threshold TB. Observe that firstDif will not equal −1 only if step 720 already found a candidate frame F* for a scene change. If step 730 determines than F[j] and F do differ by more than threshold TB, then at step 735 nDifs is incremented. The variable nDifs counts the number of frames prior to (i.e., to the left of) frame F* which differ significantly from the current frame F. After step 735 is complete, control passes to step 740. If step 730 determines that F[j] and F do not differ by more than TB, then control passes directly to step 740. Observe that frame F[j] is being compared to current frame F, and not to candidate frame F*.

At step 740 a determination is made as to whether frames F[j] and F are substantially similar; specifically, whether the distance between frames F[j] and frame F is less than a lower threshold TC. If such a frame F[j] is found, then the variable lastSame is set to j at step 745, indicating that a frame preceding (i.e., to the left of) candidate frame F* is substantially similar to current frame F, control passes to step 750. Otherwise, control passes directly from step 740 to step 750.

At step 755 a determination is made as to whether the loop on j is complete. If j is less than SigHist, then the loop continues and control passes back to step 710. Otherwise, control passes to part B of the algorithm (FIG. 7B), where a determination is made as to whether frame F* is to be marked as a scene change, based on the values of firstDif, nDifs and lastSame.

At step 760 a determination is made as to whether firstDif exceeds FrameHist/3, where FrameHist is a size for a frame history buffer. If so, then at least FrameHist/3 frames following frame F* are substantially similar. At step 765 a further determination is made as to whether nDifs exceeds FrameHist/3. If so, then at least FrameHist/3 frames prior to frame F* are substantially different from current frame F. At step 770 yet a further determination is made as to whether lastSame is less than or equal to firstDif. If so, then there are no frames prior to F*, among the SigHist frames processed, which are substantially similar to current frame F. If any of the tests at steps 760, 765 and 770 are negative, then candidate frame F* is rejected, and processing terminates at step 780. If the tests at steps 760, 765 and 770 are all affirmative, then candidate frame F* is marked as a bona fide scene change, and processing terminates at step 780. Since frame F* denotes the frame that is firstDif+1 frames prior to the current frame F, the time code for the first frame of the new scene (i.e., the frame immediately following frame F*) is $$\text{time} = t - \text{firstDif} \cdot \text{frameAvgTimeperFrame}. \quad (2)$$

This timecode is stored in an array SceneChange. This represents the time code for the first frame in the new scene.

FIG. 8 shows an example of a digital processing system which may be used with the present invention. The digital processing system 800 includes a processor 801 and a memory 802 which are coupled together by a bus 803. The bus is also coupled to a video I/O port 804 which is in turn coupled to a camera 805. The bus 803 is also coupled to an I/O controller 806 which in turn is coupled to several I/O (input/output) devices 807. It will be appreciated that in one embodiment, the data processing system 800 may be a conventional general purpose computer having a microprocessor, which is the processor 802, and DRAM memory which serves as the memory 802. Typically, other memory elements may be utilized in a digital processing system such as a magnetic hard disk and other types of mass storage. The video input/output port 804 allows a camera 805 to input into the memory 802 various frames of video which can then be processed according to the scene change detection methods of the present invention. The I/O controllers 806 allow a user of the system 800 to interact with the system by providing commands to the system or data to the system. Examples of input/output devices 807 include mice, keyboards, printers, scanners, display devices such as liquid crystal displays or CRT displays. In one exemplary embodiment, the camera 805 may be a conventional video camera which is a digital camera having a firewire (IEEE 1394) port. The video I/O port 804 may be a corresponding firewire port. Typically, the camera 805 will transmit video frames through the port 804 and through the bus 803 into the memory 802 where these frames can then be analyzed for scene change detection by using software which may practice various different embodiments of the present invention.

Figure 9:
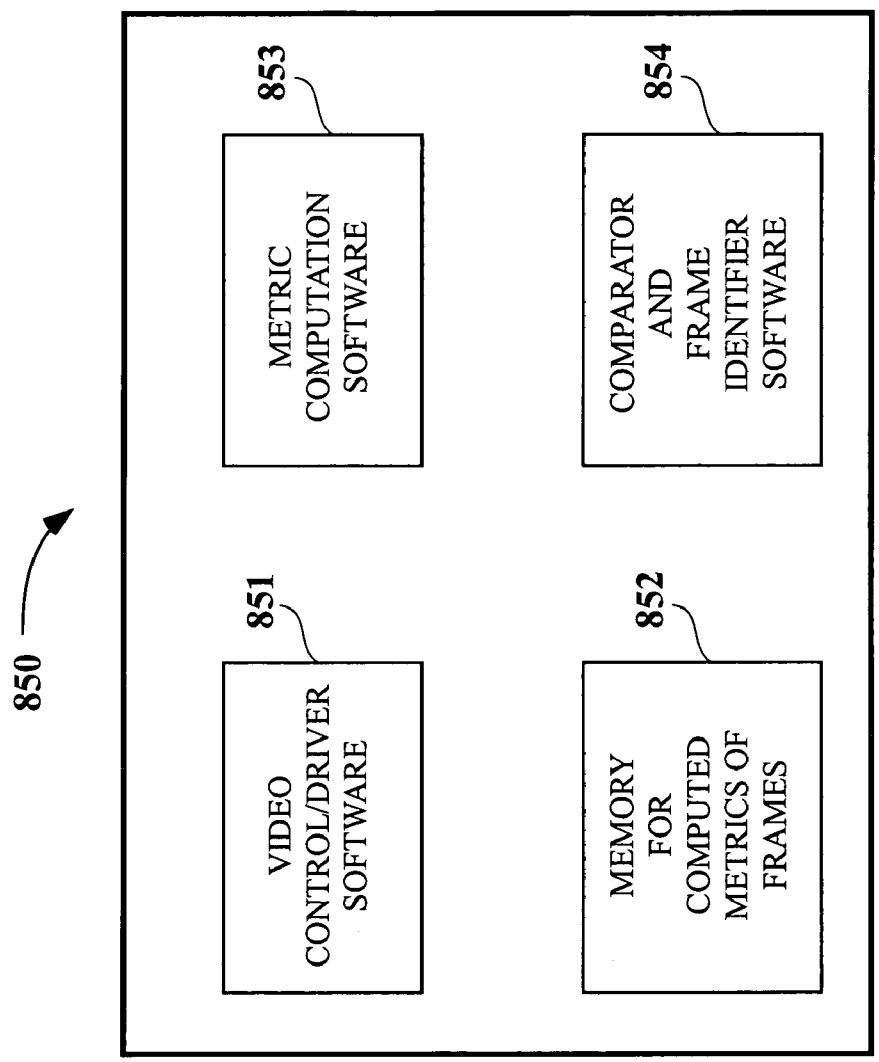
FIG. 9 shows an example of a machine readable medium which provides/stores executable computer program instructions which when executed by a data processing system cause the system to perform at least one of various methods of the invention.

FIG. 9 shows an example of a machine readable media such as a memory device such as DRAM or a magnetic hard disk which stores executable computer program instructions which, when executed by a data processing system, cause this system to perform at least one of the various methods of the present invention. This executable software and data may be stored in various places including, for example, in DRAM, which is volatile, or in non-volatile storage devices such as magnetic hard disks. Portions of this software and/or data may be stored in any one of these devices. The video control/driver software 851 provides necessary controls and driver software for allowing for inputting and outputting of video frames to the video I/O port 804. The memory 852 is used to store computed metrics of the various frames which then can be processed by the comparator and frame identifier software 854. The comparator and frame identifier software compares the metrics in the manner described in the various methods of the present invention in order to identify a frame indicating a scene change. The metric computation software 853 provides the software which computes the metrics for each frame according to the various different embodiments of the present invention.

Reference is now made to Appendix A, which includes a software listing for an algorithm that derives scene changes from within a digital video sequence. The method SceneList::AnalyseFrame(BYTE *pData, double time) processes a sequence of video frames, identifies individual scenes within the video, and records the results in an array m_SceneList that stores the time codes for the first frame of each identified scene. AnalyseFrame( ) has two calling parameters; namely, a pointer pData into the color pixel data of a current frame within a sequence of video frames, and a current time that corresponds to the time code for the current frame. AnalyseFrame( ) is called repeatedly as each additional video frame of data is processed, and it searches for a scene change, processing a number of frames backwards from the current frame.

The lines of code t=time−firstDif*m_frameAvgTimePerFrame;
if(m_nCurSceneNo<MAX_SCENES){
    m_SceneList[m_nCurSceneNo]=t;

at the end of AnalyseFrame( ) store timecode t at position m_nCurSceneNo within array m_SceneList. The timecode t is calculated backwards from a current time, t=time, by going back a number, firstDif, of frames. The array m_SceneList thus stores the time codes for the start of each new scene in the video sequence.

The number firstDif is the index of the first frame prior to a current frame, that differs from it significantly. The test for this is at the line

```
if(diffHist[j]-diffHist[j-1]>st){
    // We found a candidate:
    firstDif=j;
``` at which firstDif is flagged when diffHist[j] and diffHist[j−1] differ by more than a threshold, st. The array diffHist[j] stores the histogram-based differences between the frame that is j+1 frames prior to the current frame, and the current frame, as indicated in FIG. 2. As above, the index j runs backwards in time. The calculation of diffHist[ ] is performed at the lines

```
for(i=0;i<nB;i++){
    totalDiff+=fabs(m_oldRBuckets[k][i]-m_RBuckets[i]);
    totalDiff+=fabs(m_oldGBuckets[k][i]-m_GBuckets[i]);
    totalDiff+=fabs(m_oldBBuckets[k][i]-m_BBuckets[i]);
}
diffHist[j]=totalDiff;
```

The arrays m_oldRBuckets[ ][ ], m_oldGBuckets[ ][ ], and m_oldBBuckets[ ][ ] store histograms for frames prior to the current frame, and the arrays m_RBuckets[ ], m_GBuckets[ ] and m_BBuckets[ ] store histograms for the current frame. Thus diffHist[0], for example, represents the difference between the current frame and the frame prior to the current frame.

Note that the histograms m_RBuckets[ ], m_GBuckets[ ] and m_BBuckets[ ] are created by sampling the three color channels at a sampling grid spaced by units of m_grid. This is effectuated by the lines

```
for(r=0;r<m_imgHeight;r+=m_grid){
    px=pData+3*r*m_imgHeight;
    for(c=0;c<m_imgWidth;c+=m_grid){
        blue=px[0];
        green=px[1];
        red=px[2];
        red>>=m_scale;
        green>>=m_scale;
        blue>>=m_scale;
        m_RBuckets[red]+=(float)wt;
        m_GBuckets[green]+=(float)wt;
        m_BBuckets[blue]+=(float)wt;
        px+=3*m_grid;
```

The arrays m_oldRBuckets[ ][ ], m_oldGBuckets[ ][ ], and m_oldBBuckets[ ][ ] are circular frame buffers for each color channel, that can store up to a maximum of m_nFrameHist frames in their histories. The lines

```
// Frame count from the start of the effect:
    int frameNum=(unsigned int) (time/m_frameAvgTimePerFrame);
// index into circular buffer of historical frame statistics:
    int nF=frameNum % m_nFrameHist;
    for(i=0;i<nB;i++){
        m_oldRBuckets[nF][i]=m_RBuckets[i];
        m_oldGBuckets[nF][i]=m_GBuckets[i];
        m_oldBBuckets[nF][i]=m_BBuckets[i];
        m_RBuckets[i]=0;
        m_GBuckets[i]=0;
        m_BBuckets[i]=0;
    }
``` write the latest frame histogram data into position NF, in the middle of the circular buffer. This position becomes the head for the stored frames, with the data for the m_nFrameHist frames prior to frame NF stored behind it in a circular wrap-around fashion.

Similarly, the lines

```
for(j=0;j<m_nSigHist; j++) {
    int k;
    double totalDiff;
    k=(m_nFrameHist+nF-j) % m_nFrameHist;
``` serve to loop the index k through the circular frame buffer, backwards from position nF, as the index j runs from 0 to m_nSigHist−1.

The circular frame buffer holds up to a maximum of m_nFrameHist frames. However, as processing begins and the buffer accumulates successive frames, the running length of the buffer is given by m_nSigHist. The lines

```
if(m_nSigHist<m_nFrameHist)
    ++m_nSigHist;
else
    m_nSigHist=m_nFrameHist;
``` increase the value of nSigHist as each new frame is added into the circular buffer, up to the maximum size of m_nFrameHist.

After firstDif is determined, as described above, a second number, nDifs, is determined, in order to count the number of frames preceding the candidate frame that differ from the current frame by more than the threshold st. This is carried out at the lines

```
// count the number of frames after our candidate that
//differ from the current frame:
    if(diffHist[j]>st){
        ++nDifs;
```

A third number, lastSame, is determined to indicate the oldest frame in the circular buffer than is similar to the current frame, within a threshold SD_REJECT_THRESHOLD*st. This is carried out at the lines

```
// reset the scan if we find a frame similar to the current one:
    if(diffHist[j]<SD_REJECT_THRESHOLD*st){
        lastSame=j;
```

After the three parameters, firstDif, nDifs and lastSame have been determined, the logic for deciding whether or not the frame located at firstDif is indeed a bona fide scene change is carried out at the lines

```
if(firstDif>=m_nFrameHist/3                    &&
    nDifs>m_nFrameHist/3
    && lastSame<=firstDif){
```

After AnalyseFrame( ) has found all of the scenes and determined the array m_SceneList[ ], the method SceneList::jogScene(int nScenes, double Position) is used to run through the list of scenes. jogScene is called with a offset parameter, nScenes, and with a timecode position, Position. The array m_SceneList is searched for the first scene change timecode that follows Position, this being the next scene to locate. In order not to provide the same scene change position as in an earlier call to jogScene, Position is first incremented by half of a frame duration.

It will be appreciated by persons skilled in the art that the present invention is not limited by what has been particularly shown and described hereinabove. Rather the present invention includes combinations and sub-combinations of the various features described hereinabove as well as modifications and extensions thereof which would occur to a person skilled in the art and which do not fall within the prior art.

APPENDIX A

```
//====================================================================;
//
// SceneDetector.h
//
// Scene Detector Filter
//
// Copyright (c) 2000 MGI Software. All Rights Reserved.
//
// Author: Geoff Park
//
//-------------------------------------------------------------------------
#include "VideoIPTransform.h"
#define MAX_SCENES 2000
#define MAXFRAMEHISTORY 180
#define SCNDT_MODE_REVIEW 0
#define SCNDT_MODE_ANALYSE 1
class SceneList {
public:
// scene detection parameters:
char m_SceneLogFileName[256];
FILE *m_SceneLogFile;
int m_grid;
int m_scale;
double m_threshold;
int m_nFrameHist;
int m_nSigHist;
int m_imgWidth;
int m_imgHeight;
double m_frameAvgTimePerFrame;
// color histogram buckets
float m_RBuckets[256];
float m_BBuckets[256];
float m_GBuckets[256];
float m_oldRBuckets[MAXFRAMEHISTORY][256];
float m_oldBBuckets[MAXFRAMEHISTORY][256];
float m_oldGBuckets[MAXFRAMEHISTORY][256];
int m_nCurSceneNo, m_nSceneCount;
double m_SceneList[MAX_SCENES];
//constructor
SceneList();
//destructor
~SceneList();
void init();
void finit();
bool AnalyseFrame(BYTE *pData, double time);
double jogScene(int nScenes, double Position);
};
class CSceneDetector : public CVideoIPTransform,
public IIPSceneDetectorFilt,
public ISpecifyPropertyPages,
public CPersistStream
{
public:
DECLARE_IUNKNOWN;
static CUnknown * WINAPI CreateInstance(LPUNKNOWN punk, HRESULT *phr);
// Reveals ISceneDetector and ISpecifyPropertyPages
STDMETHODIMP NonDelegatingQueryInterface(REFIID riid, void ** ppv);
// CPersistStream stuff
HRESULT WriteToStream(IStream *pStream);
HRESULT ReadFromStream(IStream *pStream);
// Overrriden from CVideoIPTransform base class
HRESULT CheckInputType(const CMediaType *mtIn);
HRESULT CheckTransform(const CMediaType *mtIn, const CMediaType *mtOut);
HRESULT GetMediaType(int iPosition, CMediaType *pMediaType);
HRESULT StopStreaming();
HRESULT StartStreaming();
// These implement the custom IIPEffect interface
STDMETHODIMP put_GraphPosition(double Position);
STDMETHODIMP get_GraphPosition(double *Position, double *time, int *nScenes = NULL);
STDMETHODIMP jogScene(int nScenes);
STDMETHODIMP jogFrame(int nFrames);
STDMETHODIMP put_AnalyseParams(double threshold,double window);
STDMETHODIMP get_AnalyseParams(double *pthreshold,double *pwindow);
STDMETHODIMP analyse(void);
STDMETHODIMP get_SceneTime(int index, double *pTime);
STDMETHODIMP init(void);
```

-continued

APPENDIX A

```
STDMETHODIMP finit(void);
STDMETHODIMP useIMPos(bool usePos);
// ISpecifyPropertyPages interface
STDMETHODIMP GetPages(CAUUID *pPages);
// CPersistStream override
STDMETHODIMP GetClassID(CLSID *pClsid);
private:
IMediaSeeking *m__pISeek;
IMediaPosition *m__pIPos;
IMediaControl *m__pIControl;
// Constructor
CSceneDetector(TCHAR *tszName, LPUNKNOWN punk, HRESULT *phr);
// Destructor
~CSceneDetector(void);
void NNResize(void *inPx, void *outPx);
// Look after doing the special effect
BOOL CanPerformSceneDetector(const CMediaType *pMediaType) const;
HRESULT Transform(IMediaSample *pMediaSample);
CCritSec m__FiltLock;          // Private critical section
int   m__effect;               // Which effect are we processing
bool m__needToCopyBuffer;
bool m__useIMediaPosition;
unsigned int m__frameNum;
double m__frameAvgTimePerFrame; //in 100ns units
double m__effectStartTime;     //When the text effect will begin
double m__effectEndTime;       // When text effect ends
double *m__pPointTimes;        //
double *m__pPointValues;       //
double *m__pPointV2;           //
int m__nPoints, m__maxPoints, m__curPoint;
const long m__lBufferRequest; // The number of buffers to use
// filter mode:
int m__mode;
SceneList m__Scenes;
//HANDLE m__hWaitForASceneEvent;
};// SceneDetector
//===================================================================
==;
// SceneDetector.CPP
//
// Derived from EZRGB.CPP demo filter, Copyright (c) Microsoft Corporation.
//
// Copyright (c) 1998 MGI Software. All Rights Reserved.
//
// $Revision: 1 $
//-------------------------------------------------------------------------;
//
//
// Summary
//
// This is a sample special effects filter - it works only with RGB24 formats.
//
//
// Demonstration instructions
//
// Start GRAPHEDT available in the ActiveMovie SDK tools. Drag and drop any
// MPEG, AVI or MOV file into the tool and it will be rendered. Then go to
// the video renderer box and disconnect its input pin from the filter it is
// connected to. Go to the Graph menu and select Insert Filters, from the
// dialog select the Special Effects filter and dismiss the dialog, back in
// the tool workspace connect the output of the decoder to the input of the
// sample filter and then connect the output of the sample to the input of
// the video renderer (GRAPHEDT may put a colour space convertor in between)
//
//
// Files
//
// SceneDetectorprop.cpp    A property page to control the video effects
// SceneDetectorprop.h      Class definition for the property page object
// SceneDetectorprop.rc     Dialog box template for the property page
// SceneDetector.cpp        Main filter code that does the special effects
// SceneDetector.def        What APIs we import and export from this DLL
// SceneDetector.h          Class definition for the special effects filter
// SceneDetector.reg        What goes in the registry to make us work
// SceneDetectoruids.h      Header file containing the filter CLSIDs
// iSceneDetector.h         Defines the special effects custom interface
// makefile      How we build it. . .
```

-continued

APPENDIX A

```
// resource.h    Microsoft Visual C++ generated resource file
//
//
// Base classes used
//
// CVideoIPTransform    MGI In-Place/Copy Video Filter Base Class.
// CPersistStream       Handles the grunge of supporting IPersistStream.
//
//
#include <stdio.h>
#include <math.h>
#include <windows.h>
#include <streams.h>
// Logfile location:
#define SD_LOGFILE "\\TEMP\\Scene.Log"
// Some Fudge Factors:
#define SD_EDGE_FADEWIDTH 0.2
#define SD_REJECT_THRESHOLD 1.2
#define SD_GRID_SUBSAMPLE 1
#define SD_HIST_SUBSAMPLE 3
#define SD_LOW_THRESHOLD 2.0
#define SD_HIGH_THRESHOLD 8.0
#define SD_DEFAULT_THRESHOLD 3.0
#define SD_NFRAMES_IN_WINDOW 30
// constructor
SceneList::SceneList(){
    m_grid = SD_GRID_SUBSAMPLE;
    m_scale = SD_HIST_SUBSAMPLE;
    m_threshold = SD_DEFAULT_THRESHOLD;
    m_nFrameHist = SD_NFRAMES_IN_WINDOW;
    m_nSigHist = 0;
    strcpy(m_SceneLogFileName,SD_LOGFILE);
    m_SceneLogFile = NULL;
    for(int i=0;i<256;i++){
        m_RBuckets[i] = 0;
        m_GBuckets[i] = 0;
        m_BBuckets[i] = 0;
    }
    for(int nF=0;nF<MAXFRAMEHISTORY;nF++){
        for(int i=0;i<256;i++){
            m_oldRBuckets[nF][i] = 0;
            m_oldGBuckets[nF][i] = 0;
            m_oldBBuckets[nF][i] = 0;
        }
    }
}
//destructor
SceneList::SceneList(){
}
void SceneList::init(){
    if(m_SceneLogFile != NULL)
        fclose(m_SceneLogFile);
    for(int i=0;i<MAX_SCENES;i++)
        m_SceneList[i] = 0;
    m_nSceneCount = m_nCurSceneNo = 0;
    m_nSigHist = 0;
}
void SceneList::finit(){
    if(m_SceneLogFile != NULL)
        fclose(m_SceneLogFile);
    m_SceneLogFile = NULL;
    m_nCurSceneNo = 0;
    m_nSigHist = 0;
}
double SceneList::jogScene(int nScenes, double Position){
    Position += m_frameAvgTimePerFrame/2.0;
    for(int i=0;i<m_nSceneCount;i++){
        if(m_SceneList[i] > Position) break;
    }
    i += nScenes - 1;
    if(i < 0) i = 0;
    if(i >= m_nSceneCount) i = m_nSceneCount - 1;
    Position = m_SceneList[i];
    m_nCurSceneNo = i;
    return Position;
}
//-----------------------------------------------------------------------;
```

-continued

APPENDIX A

```
// AnalyseFrame:    Detects scene changes. Called for each frame of video.
//
// BYTE *pData      Pointer to image data in RGB format (3 bytes per pixel).
// double time      Time in seconds since start of video.
//
// Method:
//
// Where:
//
// m_grid           - sample grid spacing, default=8
// nB               - number of color quantization levels, default=16
// m_nFrameHist     - number of frames of history kept for analysis.
// m_nSigHist       - frames considered significant, 0<m_nSigHist<=m_nFrameHist
//
// Pixels are sampled from the image on a grid with spacing m_grid.
// Each color channel is quantized into nB levels. For each color channel,
// an array of nB buckets is used to record the number of pixels whose color
// falls in each range.
//
// A circular history buffer of length m_nFrameHist is maintained for each
// color channel. At any point in time m_nSigHist of these are considered
// by the algorithm. When a scene is detected m_nSigHist is reset to the first
// frame of the new scene.
//
// The differences of the current frame from each of the m_nSigHist previous
// frames are computed by summing the absolute value of the differences of
// each of the buckets in each color channel. These differences are recorded
// in reverse chronological order in an array, diffHist.
//
// A potential scene change is initially detected by looking for successive
// entries in this array whose difference exceeds a threshold.
//
// To reduce false triggering on lighting changes, camera flashes etc., some
// additional conditions are required:
// 1) The candidate frame must be preceded by m_nSigHist/3 similar frames,
//      so that we can be sure that a new scene exists.
// 2) The frames following the candidate frame must contain at least
//      m_nSigHist/3 frames that differ from the current frame.
// 3) If a frame after the candidate frame is encountered that differs from the
//      current frame by less than half the threshold, the candidate frame
//      is discarded and the search is reset.
//
//-----------------------------------------------------------------------;
bool SceneList::AnalyseFrame(BYTE *pData, double time){
    unsigned char *px;
    int r,c,ij;
    // the number of bands in each histogram:
    int nB = 256>>m_scale;
    // Frame count from the start of the effect:
    int frameNum = (unsigned int) (time/m_frameAvgTimePerFrame);
    // index into circular buffer of historical frame statistics:
    int nF = frameNum % m_nFrameHist;
    for(i=0;i<nB;i++){
        m_oldRBuckets[nF][i] = m_RBuckets[i];
        m_oldGBuckets[nF][i] = m_GBuckets[i];
        m_oldBBuckets[nF][i] = m_BBuckets[i];
        m_RBuckets[i] = 0;
        m_GBuckets[i] = 0;
        m_BBuckets[i] = 0;
    }
    double wt, rwt;
    double hb = m_imgHeight*SD_EDGE_FADEWIDTH;
    double wb = m_imgWidth*SD_EDGE_FADEWIDTH;
    for(r=0;r<m_imgHeight;r += m_grid){
        px = pData + 3*r*m_imgHeight;
        // weight pixels near edge less, to lessen effect of camera jiggle:
        rwt = 1.0;
        if(r < hb)rwt = 1.0 - (hb - r)/hb;
        if(r > m_imgHeight - hb) rwt = (m_imgHeight - r)/hb;
        for(c=0;c<m_imgWidth;c += m_grid){
            unsigned int red, green, blue;
            wt = rwt;
            // weight pixels near edge less, to lessen effect of camera jiggle:
            if(c < wb) wt *= 1.0 - (wb - c)/wb;
            if(c > m_imgWidth - wb) wt *= (m_imgWidth - c)/wb;
            blue = px[0];
            green = px[1];
```

-continued

APPENDIX A

```
            red = px[2];
            red >>= m_scale
            green >>= m_scale;
            blue >>= m_scale;
            m_RBuckets[red] += (float)wt;
            m_GBuckets[green] += (float)wt;
            m_BBuckets[blue] += (float)wt;
            px += 3*m_grid;
        }
    }
// scale factor to compensate for image size, grid spacing, and frame rate:
double scale =
255.0*(m_imgWidth/m_grid)*(m_imgHeight/m_grid)*m_frameAvgTimePerFrame;
// scaled threshold:
double st = scale*m_threshold/100.0;
// difference of current frame with m_nSigHist previous frames:
double diffHist[MAXFRAMEHISTORY];
if(m_nSigHist < m_nFrameHist)
        ++m_nSigHist;
else
        m_nSigHist = m_nFrameHist;
for(j=0;j < m_nSigHist; j++){
    int k;
    double totalDiff;
    k = (m_nFrameHist + nF - j) % m_nFrameHist;
    totalDiff = 0;
    for(i=0;i<nB;i++){
        totalDiff += fabs(m_oldRBuckets[k][i] - m_RBuckets[i]);
        totalDiff += fabs(m_oldGBuckets[k][i] - m_GBuckets[i]);
        totalDiff += fabs(m_oldBBuckets[k][i] - m_BBuckets[i]);
    }
    diffHist[j] = totalDiff;
}
// scan the difference history for scene changes:
int nDifs, firstDif, lastSame;
nDifs = 0;
lastSame = 0;
firstDif = -1;
nDifs = 0;
for(j=1;j<m_nSigHist;j++){
    if(firstDif == -1){
        lastSame = j;
        if(diffHist[j] - diffHist[j-1] > st){
            // We found a candidate:
            firstDif = j;
        }
    } else {
        // count the number of frames after our candidate that
        // differ from the current frame:
        if(diffHist[j] > st){
            ++nDifs;
        }
        // reset the scan if we find a frame similar to the current one:
        if(diffHist[j] < SD_REJECT_THRESHOLD*st){
            lastSame = j;
        }
    }
}
bool foundOne = false;
    // It's really a scene change only if the new scene has at
    // least m_nSigHist/3 similar frames, and the old one has
    // at least m_nSigHist/3 dissimilar ones.
    // We also reject if frame similar to first frame appears later.
    if(firstDif >= m_nFrameHist/3 && nDifs > m_nFrameHist/3
        && lastSame <= firstDif){
        double t;
        t = time - firstDif*m_frameAvgTimePerFrame;
        if(m_nCurSceneNo < MAX_SCENES){
            m_SceneList[m_nCurSceneNo] = t;
            ++m_nCurSceneNo;
            m_nSceneCount = m_nCurSceneNo;
            foundOne = true;
        }
        if(m_SceneLogFile != NULL){
            fprintf(m_SceneLogFile,"%9.2f\n",t);
        }
        // reset the history buffer to the frame after the scene change:
```

APPENDIX A - continued

```
        m__nSigHist = firstDif;
    }
    // always set a scene at first frame:
    if(m__nCurSceneNo == 0){
        m__SceneList[m__nCurSceneNo] = 0.0;
        ++m__nCurSceneNo;
        m__nSceneCount = m__nCurSceneNo;
        foundOne = true;
    }
    return foundOne;
}// End AnalyseFrame
*/
```

What is claimed is:

1. A method for automatically detecting scene changes within a digital video sequence including a succession of frames, comprising:
   computing metrics for each of a plurality of frames from a digital video sequence, the metric of a frame being a measure of distance between the frame and a given frame;
   identifying a candidate frame from the plurality of frames for which the metric of the candidate frame differs from the metric of the predecessor frame to the candidate frame, by at least a first threshold;
   determining whether the metrics of successive ones of each of a first plurality of frames, successively following the candidate frame, differ from one another by less than a second threshold;
   further determining whether the metrics of each frame of a second plurality of frames, successively preceding the candidate frame, are larger than a third threshold; and
   marking the candidate frame as a scene change when the determining determines that the metrics of successive ones of each of the first plurality of frames differ from one another by less than the second threshold, and when the further determining determines that the metrics of each frame of the second plurality of frames are larger than the third threshold; and
   repeating each of the method operations for a next candidate frame.

2. The method of claim 1 wherein the measure of distance is based on color histograms of frames.

3. The method of claim 2 wherein the measure of difference is a sum of absolute values of differences of histogram frequencies.

4. The method of claim 2 wherein the measure of difference is a sum of squares of differences of histogram frequencies.

5. The method of claim 1 wherein said marking does not mark the candidate frame as a scene change frame if a frame preceding the candidate frame is substantially similar to a current frame.

6. A system for automatically detecting scene changes within a digital video sequence including a succession of frames, comprising:
   a processor computing metrics for each of a plurality of frames from a digital video sequence, the metric of a frame being a measure of distance between the frame and a given frame;
   a frame identifier identifying and marking a candidate frame for which the metric of the candidate frame differs from the metric of the predecessor frame to the candidate frame, by at least a first threshold;
   a comparator determining whether the metrics of successive ones of each of a first plurality of frames, successively following the candidate frame, differ from one another by less than a second threshold, and determining whether the metrics of each frame of a second plurality of frames, successively preceding the candidate frame, are larger than a third threshold; and
   a scene change marker marking the candidate frame as a scene change frame, when the comparator determines that the metrics of successive ones of each of the first plurality of frames differ from one another by less than the second threshold, and that the metrics of each frame of the second plurality of frames are larger than the third threshold.

7. The system of claim 6 wherein the measure of distance is based on color histograms of frames.

8. The system of claim 7 wherein the measure of distance is a sum of absolute values of differences of histogram frequencies.

9. The system of claim 7 wherein the measure of distance is a sum of squares of differences of histogram frequencies.

10. The system of claim 6 wherein said scene change marker does not mark the candidate frame as a scene change frame if a frame preceding the candidate frame is substantially similar to a current frame.

* * * * *